(12) United States Patent
Webster et al.

(10) Patent No.: US 7,538,862 B2
(45) Date of Patent: May 26, 2009

(54) TESTING SYSTEM FOR DIGITAL CAMERA MODULES

(75) Inventors: Steven Webster, Chu-Nan (TW);
Ying-Cheng Wu, Chu-Nan (TW);
Yuan-Po Wang, Chu-Nan (TW)

(73) Assignee: Altus Technology Inc., Chu-Nan, Miao-Li Hsien (TW)

( * ) Notice: Subject to any disclaimer, the term of this patent is extended or adjusted under 35 U.S.C. 154(b) by 259 days.

(21) Appl. No.: 11/592,768

(22) Filed: Nov. 3, 2006

(65) Prior Publication Data

US 2007/0146486 A1    Jun. 28, 2007

(30) Foreign Application Priority Data

Dec. 23, 2005    (CN)    ................. 2005 1 0121183

(51) Int. Cl.
*G01N 21/00*    (2006.01)

(52) U.S. Cl. ......................................... 356/73; 348/92

(58) Field of Classification Search ..................... 356/73
See application file for complete search history.

(56) References Cited

U.S. PATENT DOCUMENTS

2006/0038883 A1\*   2/2006   Knoedgen et al. ............. 348/92
2006/0038910 A1\*   2/2006   Knoedgen et al. ........... 348/345

\* cited by examiner

*Primary Examiner*—Roy Punnoose
(74) *Attorney, Agent, or Firm*—Steven M. Reiss

(57) ABSTRACT

A testing system (200) for digital camera modules (100) includes a first testing module (50), an assembling mechanism (60), a focusing module (62), a second testing module (70), a carrying mechanism (80), and a main processor (90). The carrying mechanism supports and transports subassemblies of the digital camera modules and the digital camera modules between the first testing module, the assembling mechanism, the focusing module and the second testing module. The first testing module, the assembling mechanism, the focusing module, the carrying mechanism, and the second testing module are all electronically connected with the main processor.

13 Claims, 2 Drawing Sheets

TESTING SYSTEM FOR DIGITAL CAMERA MODULES

BACKGROUND OF THE INVENTION

1. Field of the Invention

The present invention relates generally to testing systems for digital camera modules and, more particularly, to an automatic testing system for digital camera modules.

2. Description of Related Art

With the ongoing development of microcircuitry and multimedia technologies, digital cameras are now in widespread use. High-end portable electronic devices, such as mobile phones and personal digital assistants (PDAs), are being developed to be increasingly multi-functional. Many of these portable electronic devices are now equipped with a digital camera module.

Referring to FIG. 1, a digital camera module 100 includes an image sensing module 10, a sleeve barrel 20, and a lens module 30. The sleeve barrel 20 is a hollow cylinder with a closed end. The lens module 30 includes a plurality of lenses 302 and a lens barrel 304. In assembly, the image sensing module 10 is mounted in the sleeve barrel 20 at the closed end. The lenses 302 are mounted in the lens barrel 304, and the lens module 30 is mounted in the sleeve barrel 20 and aligned with the image sensing module 10. Finally, the digital camera module 100 is focused via adjusting a distance between the lens module 30 and the image sensing module 10.

A first typical testing system of digital camera modules includes an electrical testing module, a focusing module, and an image testing module. When using the typical testing system to test digital camera modules, each digital camera module is placed in the electrical testing module for electrical testing and then focused by the focusing module. Finally, the digital camera module is placed in the image testing module for image testing. Because each digital camera needs to be manually placed in and taken away from the electrical testing module, the focusing module, and the image testing module, the typical testing system wastes much time.

A second typical testing system of digital camera modules includes an testing machine in which a testing program for testing many functions of the digital camera modules is installed. When monitoring the digital camera modules, the digital camera modules are placed in the testing machine, and the testing machine evaluates the digital camera modules, in accordance with the testing program. This typical testing system needs less time in manually placing and removing the digital camera modules than the first typical testing system, but this system needs more time in controlling the testing machine to transform some parameters for testing for various functions. Altogether, this system also wastes much time in an overall testing process.

Therefore, a new testing system for digital camera modules is desired in order to overcome the above-described shortcomings.

SUMMARY

In a preferred embodiment thereof, a testing system for digital camera modules includes a first testing module, an assembling mechanism, a focusing module, a second testing module, a carrying mechanism, and a main processor. The carrying mechanism facilitates a transfer of subassemblies of the digital camera modules and the digital camera modules between the first testing module, the assembling mechanism, the focusing module, and the second testing module. The first testing module, the assembling mechanism, the focusing module, and the second testing module are all electronically connected with the main processor.

A method is available for testing digital camera modules, each digital camera module incorporating an image sensing module, a sleeve barrel and a lens module. The method includes the steps of:

providing a testing system including a first testing module, an assembling mechanism, a focusing module, a second testing module, a carrying mechanism, and a main processor; the carrying mechanism facilitating a transfer of subassemblies of the digital camera modules and the digital camera modules between the first testing module, the assembling mechanism, the focusing module and the second testing module; the first testing module, the assembling mechanism, the focusing module and the second testing module all being electronically connected with the main processor;

mounting each respective image sensing module into a corresponding sleeve barrel and placing each subassembly formed by an image sensing module and a sleeve barrel into the carrying mechanism;

transporting the subassemblies to the first testing module via the carrying mechanism, the first testing module testing the subassemblies and transferring data to the main processor;

moving the subassemblies to the assembling mechanism using the carrying mechanism, the assembling mechanism mounting the lens modules and the subassemblies together to thereby form digital camera modules;

conveying the digital camera modules to the focusing module via the carrying mechanism, the focusing module focusing the digital camera modules and transferring data to the main processor;

carrying the digital camera modules to the second testing module using the carrying mechanism, the second testing module monitoring the digital camera modules and transferring the testing data of each digital camera module to the main processor; and using the main processor to judge whether each digital camera module is of sufficient quality, according to the data collected.

Other advantages and novel features will become more apparent from the following detailed description when taken in conjunction with the accompanying drawings.

BRIEF DESCRIPTION OF THE DRAWINGS

Many aspects of the testing system and method for evaluating digital camera modules can be better understood with reference to the following drawings. The components in the drawings are not necessarily drawn to scale, the emphasis instead being placed upon clearly illustrating the principles of the present testing system and method. Moreover, in the drawings, like reference numerals designate corresponding parts through out the several views.

DETAILED DESCRIPTION OF THE INVENTION

Figure 1:
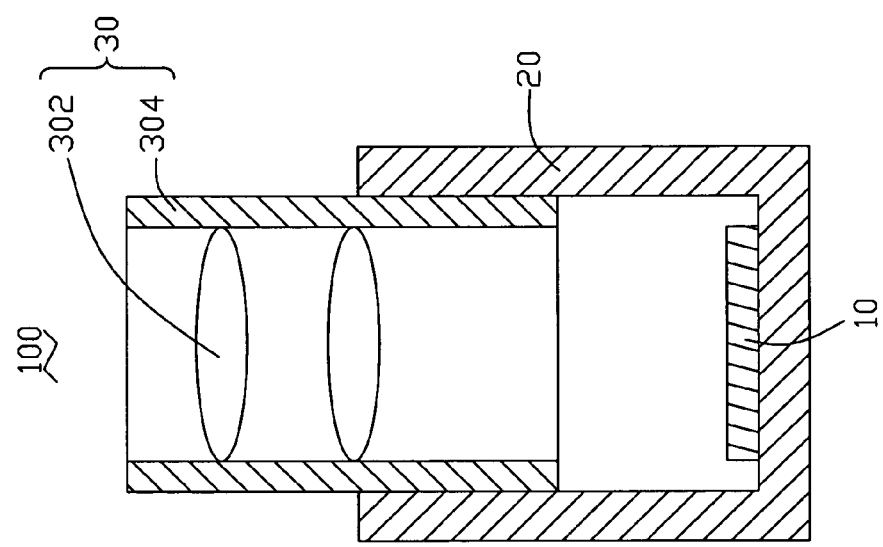
FIG. 1 is a cutaway view of a conventional digital camera module.
Figure 2:
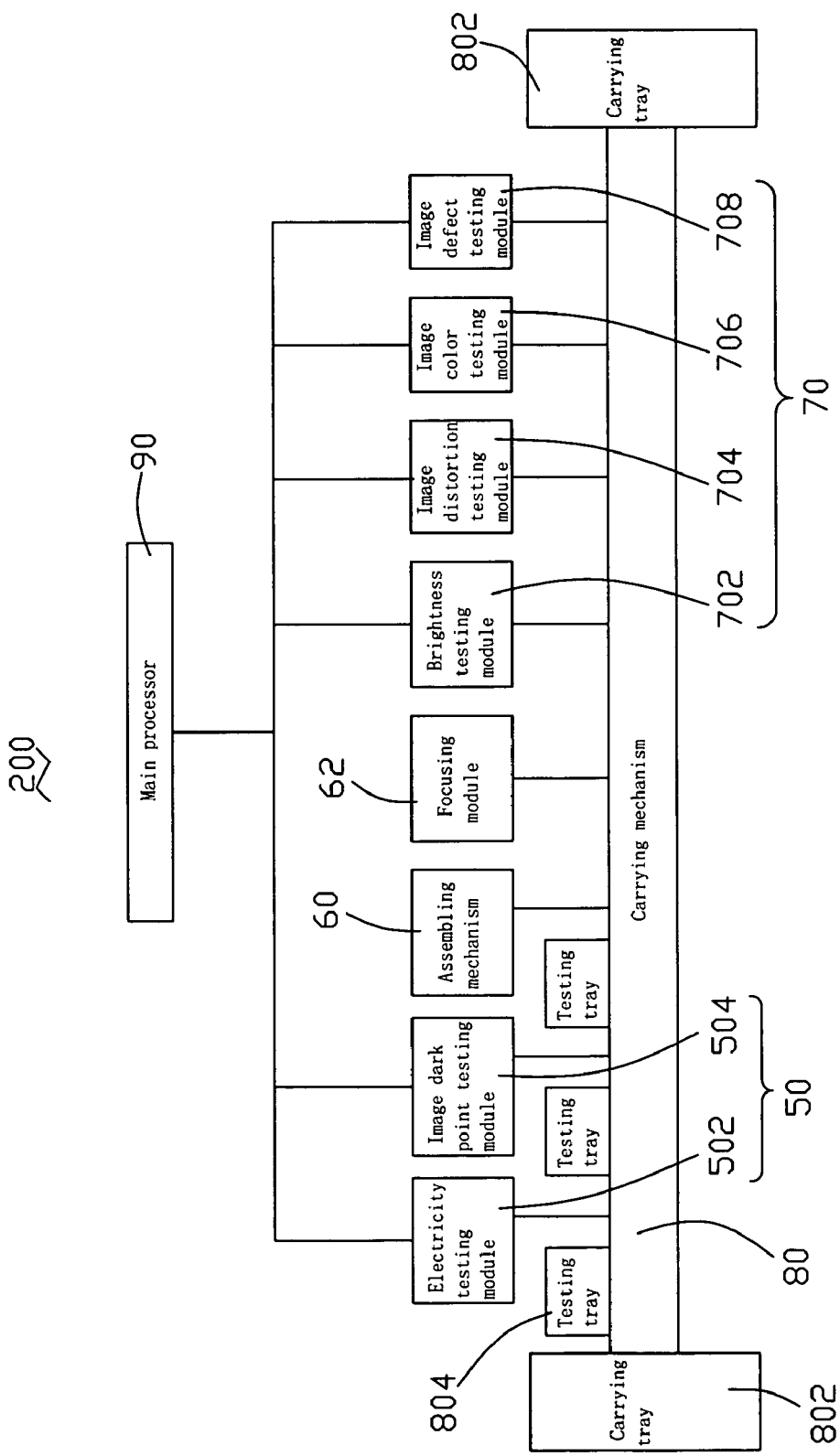
FIG. 2 is a diagram of a testing system, in accordance with a preferred embodiment.

Referring now to the drawings in detail, FIG. 1 (Related Art) shows a digital camera module 100 including an image sensing module 10, a sleeve barrel 20, and a lens module 30. FIG. 2 shows a testing system 200, in accordance with a preferred embodiment. The testing system 200 is used to evaluate a digital camera, such as the digital camera module 100.

The testing system 200 includes a first testing module 50, an assembling mechanism 60, a focusing module 62, a second testing module 70, a carrying mechanism 80, and a main processor 90. The carrying mechanism 80 supports and transports the digital camera modules 100 between the first testing module 50, the assembling mechanism 60, the focusing module 62, and the second testing module 70. The first testing module 50, the assembling mechanism 60, the focusing module 62, the second testing module 70, and the carrying mechanism 80 are all electronically connected with the main processor 90.

The first testing module 50 includes an electrical testing module 502 and an image dark-point testing module 504. The electrical testing module 502 is used to test the quality of an electrical connection of the image sensing module 10. The image dark-point testing module 504 is used to check for potential dark points of the image sensing module 10.

The assembling mechanism 60 is used to mount the lens module 30 into the sleeve barrel 20. The focusing module 62 is used to focus the digital camera module 100, thus allowing the digital camera module 100 to capture clear pictures.

The second testing module 70 includes a brightness testing module 702, an image distortion testing module 704, an image color testing module 706, and an image defect testing module 708. The brightness testing module 702 is used to test a brightness achievable with the digital camera module 100. The image distortion testing module 704 is used to evaluate the degree of image distortion produced using the digital camera module 100. The image color testing module 706 is used to monitor the color quality of the digital camera module 100. The image defect testing module 708 is used to check for image defects created in employing the digital camera module 100.

The carrying mechanism 80 is an automatic transfer mechanism including a containing tray 802, a plurality of testing trays 804, and the motors (not shown) or transfer means (not shown) needed to facilitate the movement of the trays 802, 804 with the subassemblies/camera modules 100 therein. Each testing tray 804 defines a corresponding bar code or another known registry mark. Additionally, the electrical testing module 502, the image dark point testing module 504, the brightness testing module 702, the image distortion testing module 704, the image color testing module 706, and the image defect testing module 708 all include individual testing boards (not shown), detectors (not shown), and subsidiary processors (not shown), as needed, to achieve the functionality associated with each respective module. Further, all subsidiary processors are operatively connected with the main processor.

A method for testing a plurality of digital camera modules 100, in accordance with the preferred embodiment, includes multiple steps, to be described, as follows.

A testing system 200 is provided, and each image sensing module 10 is respectively mounted into a corresponding sleeve barrel 20 to thereby form a respective subassembly. Each subassembly, formed by an image sensing module 10 and a sleeve barrel 20, is placed into a containing tray 802 of the carrying mechanism 80.

The carrying mechanism 80 moves each subassembly from its containing tray 802 into a testing tray 804. The testing trays 804, containing the subassemblies, are carried to the first testing module 504 by the carrying mechanism 80, and the first testing module 50 tests the subassemblies. Firstly, the testing board of the electrical testing module 502 evaluates an electrical connection quality between the image sensing modules 10 and the sleeve barrels 20 of the respective subassemblies. The detector of the electrical testing module 502 receives testing data regarding the electrical connection quality of the respective subassemblies and transfers the testing data to the subsidiary processor of the electrical testing module 502. The subsidiary processor, in turn, processes the data and transfers the testing data to the main processor 90. The main processor 90 records the testing data and correlates testing data of each subassembly with the bar code of the testing tray 804 in which the subassembly is placed.

After electrical testing, the subassemblies are transferred to the image dark-point testing module 504 by the carrying mechanism 80. Similarly to the electrical testing module 502, the testing board of the image dark-point testing module 504 evaluates the subassemblies but does so in relation to any dark points that may produced by the image sensing modules 10 thereof. The detector of the image dark-point testing module 504 receives testing data for the subassemblies and transfers such data to the subsidiary processor of the image dark-point testing module 504, and the subsidiary processor processes and transfers the testing data to the main processor 90. The main processor 90 records the testing data and correlates the testing data of each subassembly with the bar code of the testing tray 804 in which the subassembly is placed.

After being tested by the image dark-point testing module 504 of the first testing module 50, the testing trays 804 containing the subassemblies are transported to the assembling mechanism 60. The assembling mechanism 60 mounts the lens modules 30 into the subassemblies, so that each subassembly becomes a digital camera module 100. Each such digital camera 100 is then placed in its corresponding testing tray 804.

The carrying mechanism 80 transports the testing trays 804 containing the digital camera modules 100 to the focusing module 62 and the second testing module 70. The focusing module 62 generating data regarding a focusing ability of the respective digital camera modules 100 and transfers the focusing data of each digital camera module 100 to the main processor 90. Additionally, the second testing module 70, via the brightness testing module 702, the image distortion testing module 704, the image color testing module 706, and the image defect testing module 708 thereof, evaluates/monitors at least one performance aspect of the respective digital camera modules 100 and transfers the testing data of each digital camera module 100 to the main processor 90. The main processor 90 records the focusing data and the testing data and correlates the focusing data and the testing data of each digital camera module 100 with the bar code of the testing tray 804 in which the digital camera module 100 is placed.

After being tested, the digital camera modules 100 are carried to the containing tray 802 again. Because each group of data recorded by the main processor 90 corresponds with a bar code of a testing tray 804, the main processor can judge whether each digital camera module 100 is of sufficient quality by checking the bar code of the testing tray 804 in which the digital camera module 100 is placed. Digital camera modules 100 of sufficient quality are removed from the carrying mechanism 80 for use, and digital camera modules 100 of insufficient quality are sent for repair.

Additionally, in the testing method, if a faulty digital camera module 100 or subassembly is found by a testing module of the testing system, the main processor can prevent the latter testing modules from testing the unqualified subassembly or unqualified digital camera module 100 and thus save time. Faulty digital camera modules 100 and subassemblies can, potentially, be removed from the testing system 200 at any stage of the process. The subsidiary processors of the electrical testing module 502, the image dark-point testing module 504, the brightness testing module 702, the image distortion testing module 704, the image color testing module 706 and the image defect testing module 708 can be omitted, and data received by these components can be processed directly by the main processor 90. It is further understood that further testing modules could be added to evaluate other factors and/or that the number of testing modules could be reduced, depending on the level of quality assurance desired.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the lens module with grating to the full extent indicated by the broad general meaning of the terms in which the appended claims are expressed.

What is claimed is:

1. A testing system for digital camera modules, comprising:
    a first testing module;
    an assembling mechanism;
    a focusing module;
    a second testing module;
    a carrying mechanism configured for transporting subassemblies of the digital camera modules and the digital camera modules between the first testing module, the assembling mechanism, the focusing module, and the second testing module; and
    a main processor operatively connected with the first testing module, the assembling mechanism, the focusing module and the second testing module.

2. The testing system as claimed in claim 1, wherein the first testing module includes an electrical testing module and an image dark-point testing module.

3. The testing system as claimed in claim 1, wherein the second testing module includes a brightness testing module, an image distortion testing module, an image color testing module and an image defect testing module.

4. The testing system as claimed in claim 1, wherein the carrying mechanism includes a containing tray and a plurality of testing trays, each testing tray defining a corresponding bar code.

5. The testing system as claimed in claim 4, wherein the first testing module, the assembling mechanism, the focusing module, and the second testing module evaluate the assemblies of the digital camera modules and the camera modules and transfers resulting data to the main processor, the main processor records the data, and each group of data recorded by the main processor corresponds to a bar code of a corresponding testing tray.

6. A method for testing digital camera modules, each digital camera module including an image sensing module, a sleeve barrel, and a lens module, the method comprising the steps of:
    providing a testing system including a first testing module, an assembling mechanism, a focusing module, a second testing module, a carrying mechanism, and a main processor, the carrying mechanism being configured for transporting subassemblies of the digital camera modules and the digital camera modules between the first testing module, the assembling mechanism, the focusing module, and the second testing module, the first testing module, the assembling mechanism, the focusing module, and the second testing module all being connected with the main processor;
    mounting each respective image sensing module into a corresponding sleeve barrel to thereby form respective subassemblies;
    placing each subassembly into the carrying mechanism;
    using the carrying mechanism to transfer the subassemblies to the first testing module;
    evaluating the subassemblies with the first testing module and transferring data generated by the first testing module to the main processor;
    transporting the subassemblies to the assembling mechanism via the carrying mechanism, the assembling mechanism mounting respective lens modules and subassemblies together in order to yield respective digital camera modules;
    transferring the digital camera modules to the focusing module using the carrying mechanism, the focusing module generating data regarding a focusing ability of the respective digital camera modules and transferring such focusing data to the main processor;
    carrying the digital camera modules to the second testing module via the carrying mechanism, the second testing module testing at least one performance aspect of the digital camera modules and transferring the testing data regarding the at least one performance aspect of each digital camera module to the main processor; and
    judging, via the main processor and using the testing data, whether each digital camera module is eligible or unqualified according to the testing data received therefor.

7. The method as claimed in claim 6, wherein the first testing module includes an electrical testing module and an image dark-point testing module.

8. The method as claimed in claim 7, wherein the second testing module includes a brightness testing module, an image distortion testing module, an image color testing module, and an image defect testing module.

9. The method as claimed in claim 6, wherein the carrying mechanism includes a containing tray and a plurality of testing trays, each testing tray defines a corresponding bar code.

10. The method as claimed in claim 9, wherein each digital camera module is respectively placed in a testing tray and carried therewith.

11. The method as claimed in claim 9, wherein the first testing module, the focusing module, and the second testing module monitor one of the subassemblies and the camera modules, generate the testing data, and transfer the testing data to the main processor, the main processor recording the testing data, each group of the testing data recorded by the main processor corresponding to a bar code of a given testing tray.

12. The method as claimed in claim 9, wherein each subassembly is respectively placed in a testing tray and thus carried thereby, each respective digital camera module being carried in the testing tray of the subassembly corresponding thereto.

13. The method as claimed in claim 12, wherein the main processor judges whether each digital camera module is of sufficient quality by checking the bar code of the testing tray in which the digital camera module is placed.

* * * * *